Jan. 9, 1951 W. M. SCHROEDER 2,537,095
FLUID COUPLING
Filed Nov. 30, 1948
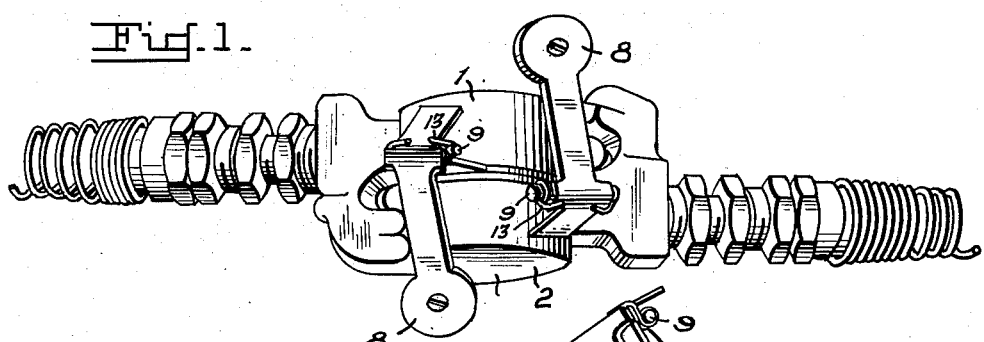
Fig. 1.
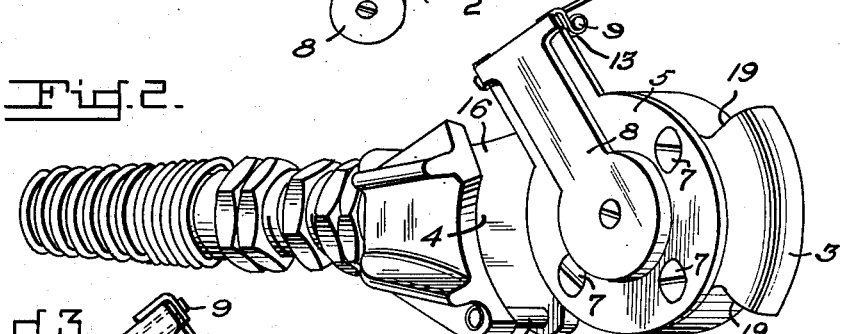
Fig. 2.
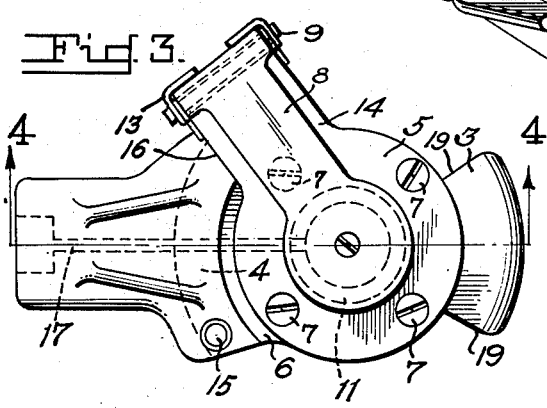
Fig. 3.
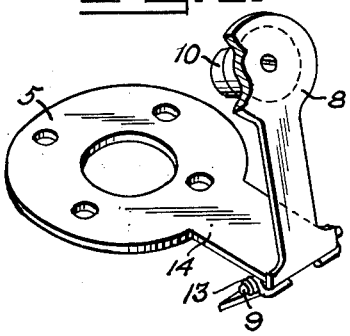
Fig. 5.
Fig. 4.
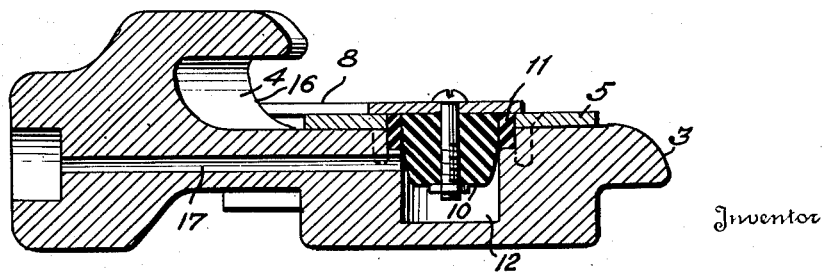
Inventor
William M. Schroeder
By J. J. Kessenich & J. H. Church
Attorneys Patented Jan. 9, 1951

2,537,095

UNITED STATES PATENT OFFICE 2,537,095

FLUID COUPLING

William M. Schroeder, Libertyville, Ill.

Application November 30, 1948, Serial No. 62,741

8 Claims. (Cl. 284—7)

(Granted under the act of March 3, 1883, as amended April 30, 1928; 370 O. G. 757)

The invention described in the specification and claims may be manufactured and used by or for the Government for governmental purposes without the payment to me of any royalty thereon.

This invention relates generally to couplings and more particularly to quickly attachable and detachable fluid couplings for use between moving vehicles in connecting fluid lines thereof.

This invention relates particularly to such quickly attachable and detachable fluid couplings as are of the type described in my copending application Serial No. 568,028, filed December 13, 1944, for Fluid Coupling, which became abandoned, of which the present application is a continuation in part.

Present and previous coupling devices for use between moving vehicles in connecting the fluid lines thereof and which have been made according to the teachings of the prior art, with which I am familiar, have been conventional screw type, ball type, or other conventional types of couplings, which are subject to relative rotation of the members while connected and which would become uncoupled upon such rotation thereof, and/or which could not be uncoupled with a straightaway pull, as when two vehicles such as a truck and its trailer break away in an emergency, without rupturing the hose.

It is, accordingly, an object of my invention to overcome the above and other defects in present and previous type couplings, and it is more particularly an object of my invention to provide a coupling which is economical in cost, economical in manufacture, easy to connect and disconnect, and efficient in operation.

Another object of my invention is to provide a fluid coupling in which unlocking thereof by rotation is prevented, but unlocking thereof by straight-away pull is permitted.

Another object of my invention is to provide a closure member for mating coupling members to check the flow of fluids and prevent the entrance of any foreign matter into the fluid lines when the mating coupling members are disconnected.

Other objects of my invention will become evident from the following detailed description, taken in conjunction with the accompanying drawings, in which:

Figure 1 is a perspective view of my novel coupling;

Figure 2 is a perspective view of one of the mating coupling members of Figure 1;

Figure 3 is a plan view of the mating coupling member of Figure 2;

Figure 4 is a view taken on the plane indicated by the line 4—4 of Figure 3;

Figure 5 is a perspective view of the face plate and closure member.

Referring now to the drawings, Figure 1 shows opposed mated coupling members 1 and 2 connected together to form the coupling. As best seen in Figures 2-4, inclusive, each coupling member 1 and 2 has tongue and groove portions 3 and 4 in opposed relationship for locking the mating coupling members 1 and 2 together by the engagement, with respect to both of the latter, of tongue portion 3 of one of the coupling members with groove portion 4 of the other of the coupling members. Both ends of each tongue portion 3 are provided with a flat surface 19 which is in a vertical plane passing substantially centrally through a recess 12 of the respective coupling member.

A face plate 5, generally circular with a laterally extending portion 14 as shown in Figures 3 and 5, is secured on the face 6 of each coupling member 1 and 2 by means of screws 7 so that portion 14 extends outwardly from face 6 of each coupling member past a point immediately adjacent entrance end 16 of the respective groove portion 4 of each coupling member. A locking and closure member 8 is hinged adjacent one end thereof by means of hinge pin 9 to the outer end of laterally extending portion 14 of each face plate 5. Secured to closure member 8 near the other end thereof is a sealing portion 10 of rubber or other suitable material adapted for sealing engagement with washer 11 of similar material in recess 12 of each coupling member 1 and 2. Closure member 8 is urged toward face plate 5, and sealing portion 10 is accordingly urged into sealing relationship with washer 11, by a spring member 13 at hinge pin 9. For a purpose hereinafter described, a stop pin or bar 15 carried by each coupling member 1 and 2 extends across the respective groove portion 4 at the other end thereof opposite entrance end 16. Recess 12 of each coupling member is in effect a port in fluid communication by passage 17 with the hose of the fluid line.

In connecting mating coupling members 1 and 2 together to form the coupling shown in Figure 1, closure members 8 are hingedly raised and thereby moved from face plates 5 to a sufficient extent to permit engagement of the face plates 5 of coupling members 1 and 2 so that one end of tongue portion 3 of each coupling member is adjacent entrance end 16 of groove portion 4 of the opposite one of each coupling member, the recesses or ports 12 registering. Following such engagement, coupling members 1 and 2 are relatively rotated slightly in a locking direction such that tongue portion 3 and groove portion 4 of one of the coupling members are in full engagement with the respective groove portion 4 and tongue portion 3 of the other of the coupling members, or, in other words, tongue portion 3 of the one of each coupling member is in complete engagement with groove portion 4 of the other of each coupling member, with recesses or ports 12 registering. As thus connected, with tongue portions 3 and groove portions 4 in alignment, one end of each tongue portion 3, adjacent entrance end 16 of the groove portion 4 of the opposite one of each of the couplings, is spaced a slight distance from closure member 8 to thereby provide a clearance therebetween; also, the other end of each tongue portion 3 is spaced a slight distance from bar 15 to provide a clearance therebetween.

It will be seen that, should coupling members 1 and 2 of the coupling as above described now tend to rotate relative to each other and thereby tend to become uncoupled, such relative rotation is limited, and uncoupling because of such relative rotation is thereby prevented. Thus, should coupling members 1 and 2 tend to relatively rotate in one direction, upon a slight amount of such rotation one of the ends, including the surface thereof, of each of tongue members 3 will engage closure member 8 on the respective opposite coupling member, whereupon further relative rotation in that direction is prevented; similarly, should coupling members 1 and 2 tend to relatively rotate in the other direction, upon a slight amount of such rotation the other end, including the surface thereof, of each of tongue portions 3 will engage bar 15 of the respective opposite coupling member, whereupon further relative rotation in this other direction is prevented.

With the relative rotation in either direction of coupling members 1 and 2 thus limited, incoupling or disengagement of coupling members 1 and 2 by any relative rotation of the latter in either direction is therefore positively prevented and could be accomplished only by an independent hingedly outward movement of closure member 8 a distance sufficient to clear the end of tongue portion 3.

It will further be seen that, with coupling members 1 and 2 connected as above described to form the coupling, an excessive straight-away pull permits tongue portion 3 of each coupling member to clear groove portion 4 of the other each coupling member and also permits, in view of the above described clearances, the surface ends of tongue portions 3 to clear closure members 8 and bars 15, and the coupling members 1 and 2 are separated. Normally, the above described clearances, between one end of tongue portion 3 of one coupling member and closure member 8 of the other coupling member, and between the other end of tongue portion 3 of one coupling member and bar 15 of the other coupling member, will be present when an excessive straight-away pull is applied. However, should it happen that an excessive straight-away pull be applied when one end of tongue portion 3 is in engagement with bar 15 and there is a correspondingly greater than normal clearance space between the other end of tongue portion 3 and closure member 8, the particular flat surface as above described on the end of tongue portion 3 in engagement with bar 15 provides for relative rotary movement under these conditions of the coupling members, whereby the tongue portion 3 clears the bar 15, and the coupling members are separated. Similarly, the coupling members are separated should an excessive straight-away pull be applied when the other end of tongue portion 3 is in engagement with closure member 8.

Upon separation of the coupling members 1 and 2, sealing portion 10 on each closure member 8 is automatically forced into the respective recess 12 in sealing relationship with washer 11 by the released energy of the spring member 13, thereby checking the flow of fluids and preventing the entrance of any foreign matter into the fluid lines when the coupling members are disconnected.

It will be noted from the above that I have provided mating self-sealing coupling members having means for locking the coupling members together, and means for preventing relative rotation and consequent disconnection thereby of the coupling members but permitting uncoupling or separation of the latter upon an excessive straight-away pull.

Various changes may be made in the specific embodiment of the present invention without departing from the spirit thereof, or from the scope of the appended claims.

What I claim is:

1. In a fluid coupling of the type comprising opposed heads connectable and disconnectable on relative rotary movement about the axis of registering fluid ports therein, a locking closure member supported by each head and sealing the fluid port thereof when said heads are disconnected, and means on said heads cooperating with said locking closure members when the heads are connected for limiting relative rotary movement thereof to prevent disconnection thereby of said heads.

2. In combination with a fluid coupling of the type comprising opposed heads having registering fluid ports therein, substantially complementary interfitting portions on the heads, said portions being engageable and disengageable on relative rotary movement of the heads about the axis of the registering ports thereof for coupling and uncoupling said heads, a locking closure member supported by each of said heads, and sealing means carried by each said closure member for closing the respective fluid port of each of said heads when the latter are uncoupled, each said locking closure member being engageable by one of said portions when said heads are coupled for limiting relative rotary movement thereof in one direction to prevent uncoupling thereby of said heads.

3. The combination with a fluid coupling of the type comprising opposed heads having registering fluid ports therein, of substantially complementary interfitting tongue and groove portions formed on the heads, said tongue and groove portions being engageable and disengageable on relative rotary movement of the heads about the axis of the registering ports thereof for coupling and uncoupling said heads, mutually engageable face plates mounted on opposed surfaces of said heads about the ports thereof, and a locking closure member supported by each head for closing the fluid port thereof when the heads are uncoupled, said locking closure member including an arm extending outwardly from a respective one of said face plates, and sealing means carried by said arm on one end thereof and adapted for insertion within the respective fluid port when the heads are uncoupled, said arm being removably disposed in the path of the tongue portion on the opposed head when said heads are coupled for limiting relative rotary movement of the heads to prevent uncoupling thereby of the latter.

4. In a fluid coupling of the type comprising opposed heads connectable and disconnectable on relative rotary movement thereof about the axis of registering fluid ports therein, a locking closure member associated with each head, sealing means carried by each locking closure member at one end thereof, spring means carried by the other end of each locking closure member, whereby said sealing means are pressed into said fluid ports when the said heads are disconnected, and means on said heads cooperating with the locking closure members to limit relative rotary movement of the heads while the latter are connected.

5. In combination with a fluid coupling of the type comprising opposed heads having registering fluid ports therein, substantially complementary interfitting portions on the heads, said portions being engageable and disengageable on relative rotary movement of the heads about the axis of the registering ports thereof for coupling and uncoupling said heads, fixed means on each of said heads engageable by one of said portions on the other of each of said heads when said heads are coupled for limiting relative rotary movement thereof in one direction, and a locking closure member on each of said heads for closing the fluid ports therein when said heads are uncoupled, said locking closure member on each one of said heads being removably engageable by said one of said portions on the other of each of said heads when said heads are coupled for limiting relative rotary movement thereof in the other direction, whereby uncoupling of said heads by relative rotation thereof is prevented.

6. In combination with a fluid coupling of the type comprising opposed heads having registering fluid ports therein, substantially complementary interfitting tongue and groove portions formed on the heads, the tongue portion on each of said heads being engageable and disengageable by the groove portion on the other of each of said heads on relative rotary movement of the heads about the axis of the registering ports thereof for coupling and uncoupling said heads, fixed means on each of said heads engageable by one end of the tongue portion of the other of each of said heads when said heads are coupled for limiting relative rotary movement thereof in one direction, and a locking closure member on each of said heads for closing the fluid ports therein when said heads are uncoupled, said locking closure member on each one of said heads being removably engageable by the other end of the tongue portion of the other of each of said heads when said heads are coupled for limiting relative rotary movement thereof in the other direction, whereby uncoupling of said heads by relative rotation thereof is prevented.

7. The combination as set forth in claim 6, wherein said fixed means on each of said heads comprises an obstruction adjacent one end of the groove portion of each of said heads and extending into the path adjacent said one end of the tongue portion of the other of each of said heads when said heads are coupled.

8. In combination with a fluid coupling of the type comprising opposed heads having registering fluid ports therein, substantially complementary interfitting tongue and groove portions formed on the heads, the tongue portion on each of said heads being engageable and disengageable by the groove portion on the other of each of said heads on relative rotary movement of the heads about the axis of the registering ports thereof for coupling and uncoupling said heads, fixed means on each of said heads adjacent one end of the respective groove portion thereof, said means being engageable by one end of the tongue portion of the other of each of said heads and forming a spaced obstruction in the path of said tongue portion when said heads are coupled for limiting relative rotary movement thereof in one direction, mutually engageable face plates mounted on opposed surfaces of said heads about the ports thereof, and a locking closure member supported by each head for closing the fluid port thereof when the heads are uncoupled, each said locking closure member including an arm hingedly extending from a respective one of said face plates, and sealing means carried by said arm at one end thereof adapted for insertion within the respective fluid port when the heads are uncoupled, said arm being engageable by the other end of the tongue portion of the other of each of said heads and forming a spaced obstruction in the path of said tongue portion when said heads are coupled for limiting relative rotary movement thereof in the other direction, whereby uncoupling of said heads by relative rotation thereof is prevented.

WILLIAM M. SCHROEDER.

REFERENCES CITED

The following references are of record in the file of this patent:

UNITED STATES PATENTS

| Number | Name | Date |
| --- | --- | --- |
| 1,128,474 | Martz | Feb. 16, 1915 |